United States Patent [19]

Adler et al.

[11] 3,872,241

[45] Mar. 18, 1975

[54] VIDEO DISC PICKUP WITH CAPACITIVE TRACKING

[75] Inventors: Robert Adler, Northfield; Roger W. Knitter, Hoffman Estates, both of Ill.

[73] Assignee: Zenith Radio Corporation, Chicago, Ill.

[22] Filed: July 12, 1973

[21] Appl. No.: 378,467

[52] U.S. Cl. .......... 178/6.6 A, 179/100.1 B, 360/77, 179/100.41 G, 179/100.41 B

[51] Int. Cl. .......... G11b 9/06

[58] Field of Search .......... 179/100.41 R, 100.41 B, 179/100.41 G, 100.1 B; 360/77, 135; 178/6.6R, 6.6 A

[56] References Cited

UNITED STATES PATENTS

| | | | |
|---|---|---|---|
| 2,721,906 | 10/1955 | Sharpe | 360/135 |
| 2,872,529 | 2/1959 | Hollmann et al. | 179/100.1 B |
| 3,034,111 | 5/1962 | Hoagland et al. | 360/77 |
| 3,187,114 | 6/1965 | McDaniel | 179/100.3 A |
| 3,404,392 | 10/1968 | Sordello | 360/77 |
| 3,691,317 | 12/1972 | Dickopp | 179/100.41 P |
| 3,783,196 | 1/1974 | Stanley | 179/100.4 M |

*Primary Examiner*—Terrell W. Fears
*Assistant Examiner*—David K. Moore
*Attorney, Agent, or Firm*—John J. Pederson; Cornelius J. O'Connor

[57] ABSTRACT

The electrostatic pick-up system is used for deriving signals which represent video program information stored on a video disc and are suitable for application to a television receiver to reproduce the video program. The pick-up itself has an increased bearing or tracking surface, leading to longer life and may be constructed to track within a single record groove or, alternatively, may bridge across and couple to a series of such grooves for radial tracking while presenting a probe in proper sensing relation to the groove that is to be sensed in any particular revolution of the disc. A generally similar arrangement omits mechanical coupling of the pick-up to the disc and, in its place, uses an electrical system to maintain radial tracking. This last-mentionend embodiment permits both stop frame and slow motion or other variable speed presentation of the image information stored in the disc.

8 Claims, 11 Drawing Figures

VIDEO DISC PICKUP WITH CAPACITIVE TRACKING

BACKGROUND OF THE INVENTION

The prospects of a record disc storing video, synchronizing and sound information to be sensed or read in a manner analogous to the playing of an audio or sound disc have long been recognized and playback devices have been proposed for sensing video discs to derive electrical signals that may be applied to the antenna terminals of a television receiver for image reproduction. Devices of this general type have been demonstrated both for monochrome and color image reproduction. A variety of approaches to this general kind of system and playback device are known and, so far as the present invention is concerned, differ from one another principally in the pickup or sensing device that derives the program information stored on the video disc.

While the discs themselves may, and generally do, have specific differences in the various systems that have been proposed, they have in common a pattern of grooves formed on the surface of the disc to constitute a spatial representation as well as storage of the time variations of a signal that is to be reproduced upon sensing or reading of the disc. Most often, a master disc is cut under the control of a carrier signal that has been frequency-modulated with the program information and the disc cutting, while it may be a series of concentric circular grooves, it is usually a single continuous spiral with an integral number of image fields per revolution of the disc. The relation of image frames to revolutions of the disc is a function of the speed of rotation. At a disc speed of 1,800 RPM, for example, there are two image fields per revolution which very conveniently comports to the interlaced field properties of the NTSC system. At 900 RPM there are two image frames per revolution while at 450 RPM there are four frames per revolution.

The recorded information may be read with what has become known as a pressure pickup device as described, for example, in U.S. Pat. No. 3,691,317, issued on Sept. 12, 1972 in the name of Gerhard Dickopp. It features a pressure stylus that tracks within the record groove. If the video disc is transparent or has light reflecting properties, it may be read by a light beam or a laser in system arrangements similar to that of U.S. Pat. No. 3,361,873, issued Jan. 2, 1968 to W. R. Johnson et al. This is popularly referred to as an optical system and has the attractive advantage over the pressure pickup that the sensing element has no physical contact with the disc and, therefore, the severe wear characteristic of the pressure pickup is obviated. Additionally, the ability to read information off the video disc without requiring mechanical coupling of the pickup to the disc makes possible the desirable additional features of stop frame and variable speed image reproduction.

A third system, to which the present invention is more particularly directed, employs an electrostatic pickup in which a conductive probe senses the video disc which, in this case, has a conductive coating over the stored signal information and, in turn, is covered with a layer of a suitable dielectric. Sensing such a record with a conductive probe results in capacitive variations through which an electrical signal may be developed as a replica of the program information stored on the disc. For example, the capacitive element constituted by the probe in tracking relation to the disc may serve as a variable reactance in the frequency-determining circuit of an oscillator to effect frequency modulation thereof and the generation of a carrier signal modulated by the information stored in the disc and usable in driving a television receiver.

The electrostatic system as heretofore practiced uses as a pickup element a piece of sapphire dimensioned to track within a record groove and having a metallized face serving as the conductive probe. This structure, like the pressure pickup described hereinabove, is also undesirably subject to wear and short life. Moreover, since the sapphire stylus tracks within a record groove, neither stop frame nor variable speed image reproduction has been obtainable.

Accordingly, it is a principal object of the invention to provide an improved electrostatic pickup arrangement especially suited for sensing or reading video discs.

It is another object of the invention to provide an electrostatic pickup system for a video disc player which exhibits reduced wear and, therefore, increased useful life.

Another particular object of the invention is to improve an electrostatic pickup system for a video disc reproducing device to permit stop frame and variable speed, particularly slow motion, image reproduction.

BRIEF SUMMARY OF THE INVENTION

An electrostatic pickup, constructed in accordance with the invention, for sensing undulations formed in a pattern of grooves on the surface of a record disc comprises a body of insulating material having a bearing or tracking groove with a length much greater than the pitch of the record grooves. A probe of conductive material extends through the body of insulating material transversely of and intermediate the ends of the bearing surface and projects into the plane of that surface. The probe has a dimension measured along the direction of tracking that is small relative to the spatial wavelength of the signal stored on the disc.

Radial tracking required to sense or read the program information of the multiplicity of record grooves verbatim is accomplished either by mechanical coupling between the insulating body of the pickup and the grooves of the disc or electrically by conductive elements accommodated by the bearing or tracking surface of the insulating body in such space relation to the record grooves as to be useful in developing a control potential that governs radial tracking.

BRIEF DESCRIPTION OF THE DRAWINGS

The features of the invention, believed to be novel, are set forth with particularity in the appended claims. The invention, together with further objects and advantages thereof, may best be understood, however, by reference to the following description taken in connection with the accompanying drawings, in the several figures of which like reference numerals identify like elements, and in which:

DETAILED DESCRIPTION OF THE PREFERRED EMBODIMENT

Figure 1:
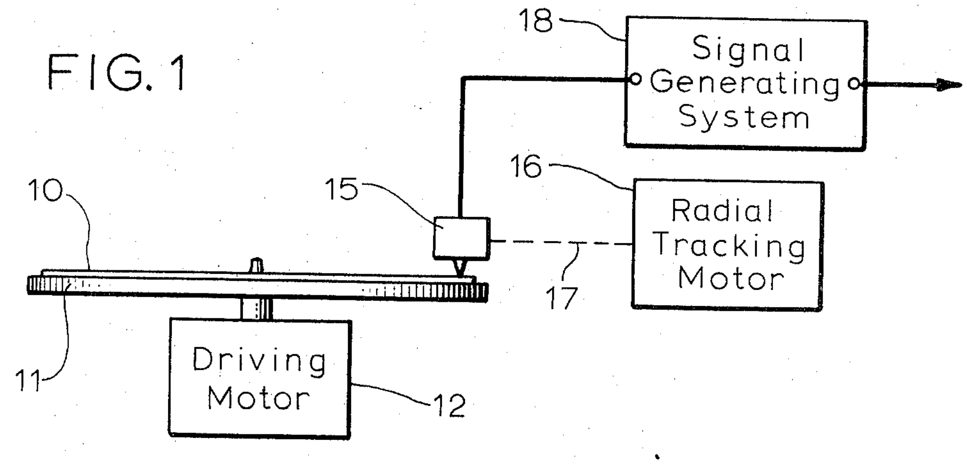
FIG. 1 is a schematic representation of a video disc playing system.

Various ways are known for reading video discs. In particular, if the disc is a light flexible foil it may be rotated at a high speed and flown, that is to say, supported on an air cushion while it is being read. Illustrations of systems featuring a floating video disc are found in U.S. Pat. No. 3,381,085 issued Apr. 30, 1968 to W. R. Johnson et al. and also in U.S. Pat. No. 3,603,742, issued Mar. 21, 1972 in the name of Eduard Schuller. Alternatively, the video disc may be supported on a rotatable turntable for reading which, of course, is the case if the disc is rigid. The latter arrangement is represented in FIG. 1 where a video disc 10 is shown supported upon a turntable 11 that may be driven by a motor 12 at a suitable speed. Representative speeds of video discs currently in use in laboratories are 450, 900 and 1,800 revolutions per minute.

Since the electrostatic pickup of the subject invention is especially attractive for sensing a spiral pattern of grooves, it will be assumed that the grooves cut into the surface of the video disc define a continuous spiral. The grooves have a conductive coating 13 (FIG. 2) of gold or other conductive material and a final coating 14 of suitable dielectric material, such as styrene or Parylene which is marketed by Union Carbide Corporation, New York, N.Y. (While not shown in FIGS. 4 and 5a, the grooves depicted therein also comprise a conductive base coating with a dielectric overcoat.) The undulations formed in the record grooves constitute both a spatial representation and storage of the time variations of a video program signal to be reproduced. These grooves are sensed or read by an electrostatic pickup system 15 which is controlled to sense the undulations within the record grooves one after the other. Coarse radial tracking of the pickup is usually accomplished by mounting the pickup on a support member, referred to as a boom or tracking arm, which supports the pickup in tracking relation to the grooved surface of the disc. The boom and pickup are designed to provide the proper compliance, typically 0.25 meter per Newton for the system. The relatively large compliance allows the pickup to follow vertical fluctuations in the disc. The arm may be driven in a radial direction by a mechanism 16 which may, conveniently, be simply a screw to which the tracking arm is mechanically coupled preferably through a damping type of coupling connection. Obviously, the tracking screw has a pitch related to the pitch of the record grooves so that mechanism 16 advances the pickup system at the appropriate radial speed, as indicated through the coupling connection 17. The pickup 15 is electrically coupled to a signal generating system 18 which, as explained above, may simply be a carrier signal generator including the capacitive pickup element 15 as a reactive component in its frequency-determining circuit so that the operating frequency of the oscillator is modulated by tracking the video disc to the end that a frequency-modulated signal is produced having modulations that represent the signal components stored in the video disc. Neither the video disc nor the frequency modulated oscillation generator 18 constitutes any part of the present invention and, since both are well understood in the art, they need not be described further.

More particular attention will now be directed to the structural details of the improved electrostatic pickup. The pickup may be dimensioned to fit within a record groove and physically contact the groove undulations representing the stored signal information or it may be dimensioned to subtend a number of record grooves, riding in contact with the groove walls or even being spaced therefrom by means of an air bearing plate. The in-groove tracking structure will be described in relation to FIG. 2.

Figure 2:
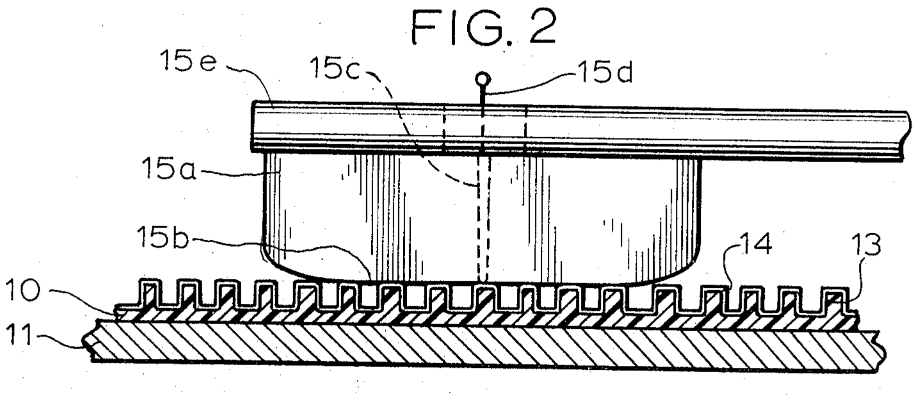
FIG. 2 is an enlarged and fragmentary view of an electrostatic pickup embodying the invention and useful in the system of FIG. 1.
Figure 3A:
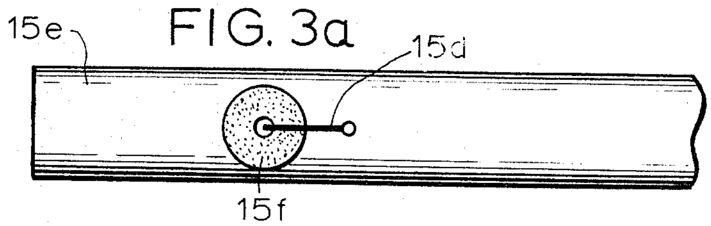
FIGS. 3*a* and 3*b* are two views of another form the pickup device may take.
Figure 3B:
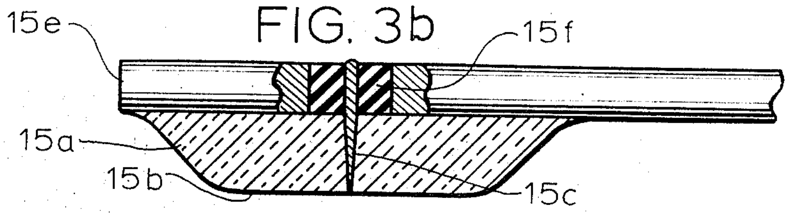
Figure 3C:
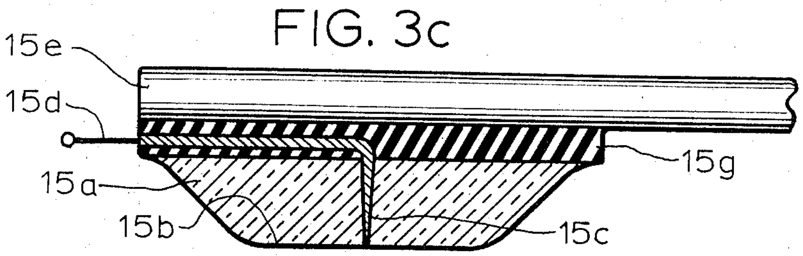
FIG. 3c shows still another form. The structures of FIGS. 2 and 3 do not show radial tracking provisions.

As there represented, the pickup comprises a body 15a of insulating material having an elongated bearing or tracking surface 15b, the length of which surface, in the direction of the record grooves, is very much greater than the pitch of the grooves. It will be obvious that the showing in FIG. 2 is not to scale simply because the relative dimensions make this too difficult. This is best illustrated by citing certain significant specifications. For example, the minimum spatial wavelength of the signal on the disc is approximately one-half a micrometer and the groove density is 140–500 per millimeter, whereas the length of bearing surface 15b of the pickup body may be as much as 500 micrometers. The insulating material to be employed in forming the body of the pickup is very much influenced by the disc speed in reproduction. If a low speed of 450 revolutions per minute is intended, flint glass may serve adequately as the body of the pickup in which case the tracking or bearing surface 15b is readily formed by lapping or grinding. The ends of the body are shaped, as shown, because sharp corners are certainly to be avoided. Sapphire is a more suitable material for insulating body 15a since it may be metallized with little difficulty and also because it will accommodate higher disc speeds.

If the pickup is to be fabricated from sapphire, the procedure is to construct the insulating body of two similar sapphire pieces dimensioned for in-groove tracking. An end face of one piece of sapphire is then metallized, either by sputtering or vacuum deposition, to provide the conductive probe 15c. Suitable metals include titanium, tantalum and chromium, the latter being particularly attractive. It may be used alone or may be overcoated with gold. The thickness of metal layer 15c is important in that it determines the minimum useful tracking radius at which the pickup is able to derive a signal having an acceptable signal-to-noise ratio. It is found, for example, that at a spatial wavelength corresponding to approximately twice the thickness of probe 15c at the end point closest to the disc and for smaller wavelengths the signal/noise ratio of the output of the probe is not useful. The probe at the tip should not exceed 3,000 Angstroms or three-tenths of a micrometer in thickness although it is distinctly preferred to have the thickness dimension in the range of 1,000 to 1,500 Angstroms in order to increase the area of the video disc that may be used for signal storage and readout.

After having metallized one sapphire piece, the insulating body may be completed by attaching the corresponding face of a second piece of sapphire to conductive layer 15c by an adhesive or an epoxy. A suitable commercially available material is marketed by Emerson and Cumming, Inc. of Canton, Mass. under the brand designation "Echobond 104." An output conductor 15*d* is connected to a contact area of probe 15*c*. The contact may be an island of the metal utilized in forming the probe or might conveniently be a conductive epoxy applied to the completed pickup subassembly. In that subassembly conductive probe 15*c* extends through the insulating body 15*a* transversely of and intermediate the ends of its bearing surface 15*b*. It has a contact area at one end while its other end projects into the plane of the bearing surface as required to permit sensing of the record groove being tracked. For the embodiment under consideration the probe may extend entirely across the meeting surfaces of the two pieces of sapphire constituting body 15*a*. Its dimension in the direction of tracking, that is in the direction of the record groove, is small relative to the minimum spatial wavelength of the signal stored on the disc. The pickup will, of course, be secured to and carried by the boom or tracking arm and preferably a layer of vibration damping material, such as rubber, is interposed between body 15*a* and the tracking arm.

It should be noted in passing that a sapphire pickup, carrying a probe in the form of a metallized end surface, is a prior art structure which has been found to have an undesirable short tracking life. In use, the metal probe wears away and loses sensitivity but the arrangement of FIG. 2 is much improved in this respect. Its wear pattern is similar to that of the lead in a pencil whereas the predecessor device, in use, suffers an increasing radius of the probe which causes it to lose sensitivity.

FIGS. *3a* and *3b* show a slightly different form of pickup device in which probe 15*c* may be described as a metal whisker. It is a wire of hard conductive material such as tantalum, tungsten or chromium that has been shaped until the tip diameter is of the order of 1 micron or less. This may be accomplished by grinding or by electrolysis. Sharpening of conductive probes by electrolysis is described in an article entitled "Sharpen Those Probes" by Thomas C. Price, page 38 of the April, 1968 issue of SOLID STATE TECHNOLOGY. The sharpened probe 15*c* is mounted in the tracking arm or boom 15*e* by an adhesive 15*f*, such as the silastic compound marketed by Dow Corning of Midland, Mich. under the trade designation 731RTV. It is a silicone rubber product and secures probe 15*c* in position in the boom with vibration damping. The pickup is completed by casting an insulating material over the whisker to form the insulating body 15*a*. A deposit of glass or epoxy, such as " Araldite 6010" distributed by Ciba-Geigy Corporation of Ardsley, N.Y., is suitable for this purpose and preferably the deposit is applied in a tear drop configuration so that lapping or grinding establishes the bearing surface 15*b*. Of course, the cross-sectional configuration of insulating body 15a is dictated by the tracking function. It will be essentially rectangular in cross-section for in-groove tracking in the manner of FIG. 2 but, if the bearing surface 15*b* is to extend over a number of record grooves and bear against them, its geometry in cross-section is only a function of the procedure used to produce the device. It may be elliptical, especially if the bearing is formed by grinding a tear-drop deposit into a flat bearing surface.

The pickup embodiment of FIG. *3c* differs from that of FIGS. *3a* and *3b* in that probe 15*c* extends through insulating body 15*a* as in the other embodiments but, in this case, instead of also projecting into an aperture in boom 15*e*, it is L-shaped and extends through a mounting pad 15*g* of rubber or other vibration damping material.

Figure 4:
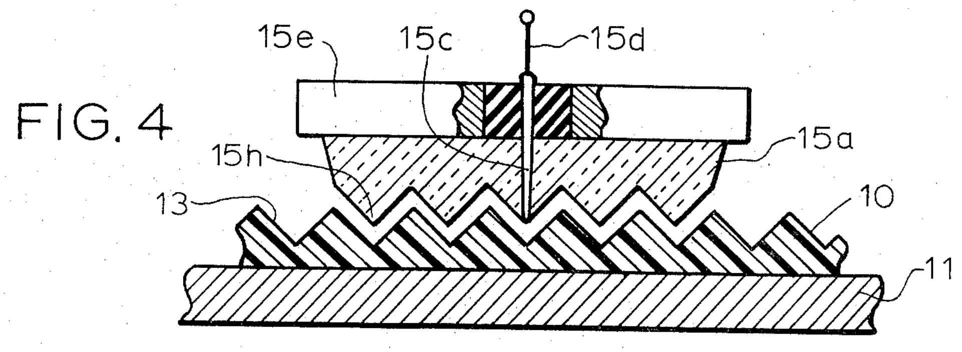
FIG. 4 is an embodiment of an electrostatic pickup device in which radial tracking is accomplished by mechanical coupling of the pickup to the record disc.
Figure 5A:
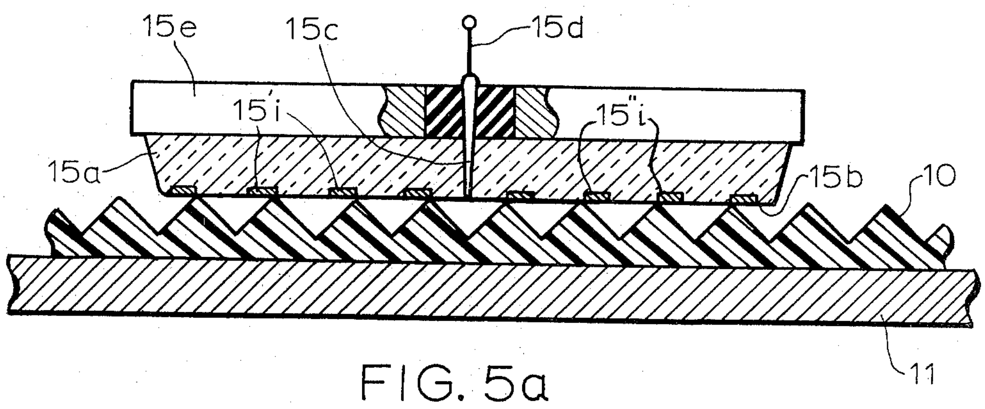
FIGS. 5a–5e, inclusive, relate to a version wherein radial tracking is obtained electrically, without mechanical coupling.

Consideration will now be given to radial tracking of a pickup structure of the types represented in FIGS. *3a–3c*, inclusive. If bearing surface 15*b* contacts and extends across a number of record grooves when boom 15*e* has presented the pickup into tracking relation with respect to the video disc, coarse radial tracking may be achieved by radial drive 16 described above implemented by a series of notches 15*h* formed in the bearing surface of insulating body 15*a* as indicated in FIG. 4. This view is a radial section and the direction of disc rotation is into or out of the plane of the drawing, whereas the showing of FIG. 2 is a section along a record groove. The notches 15h are elongated, extending in the direction of the record grooves, and the array that they provide extends radially of the disc. The notches are dimensioned to engage with and establish a mechanical coupling to the grooves 13–14 of the record. Notches 15*h*, when engaging grooves of record disc 10, present probe 15*c* in proper tracking relation and, continued rotation of that disc results in reading of the record grooves one after the other.

In the arrangement of FIG. *5a* electrical, as distinguished from mechanical, tracking takes place. In order to have electrical control of radial tracking, two families of conductive elements or fingers, 15'*i*, 15''*i* are deposited on bearing surface 15*b* of the insulating body 15*a*. Like the notches 15*h* of the arrangement of FIG. 4, these fingers extend in the direction of sensing and are positioned on bearing surface 15*b* to present, in conjunction with the record being sensed, a pair of capacitances that individually have a reference value (equal capacitances) when probe 15*c* is properly positioned in the middle of the groove being sensed. But the capacitance values vary, both in sense and amount, in accordance with radial displacement of the probe. More specifically, the conductive fingers may be connected in the manner of FIG. *5b* wherein one set 15'*i* are connected together and the remaining set 15''*i* are likewise connected together. In this arrangement the fingers of both sets 15'*i* and 15''*i* have the same mutual spacing, namely, a distance corresponding to the spacing of the record grooves but the fingers of set 15'*i* are just to the left of the record grooves whereas the fingers of set 15''*i* are an equal amount to the right of the record grooves when the pickup is in proper tracking position. For proper positioning of probe 15*c* the relation of the two sets of conductive fingers to the contiguous portions of the conductive coating 13 of the record defines a pair of capacitances and the values of the two capacitances are the same. This is a balanced condition but if, for example, probe 15*c* is displaced to the left in FIG. *5a* the capacitance of the set of fingers 15'*i* decreases while the capacitance of the other set of fingers 15''*i* increases. Conversely, displacement of the probe to the right, reduces the capacitance contributed by fingers 15''*i* but increases that of fingers 15'*i*. In other words, the capacitance values change by an amount that is a manifestation of the extent of radial displacement and the sense of the capacitance change denotes the direction in which the probe has been displaced from its preferred tracking position. This information may be supplied to a differential analyzer 20 to develop a control potential that may be employed in a servo arrangement to restore probe 15*c* to its preferred tracking relation to the record groove being sensed.

A simple form of differential analyzer comprises an oscillator supplying a signal to a pair of slope detectors with one set 15'*i* of conductive fingers serving as a tuning capacitance in one and the other set 15''*i* of conductive fingers serving as a tuning capacitance sense the other detector. Since the capacitances its vary in opposite senses as the probe is displaced radially from its intended tracking position, the response of one slope detector increases while the response of the other decreases. Feeding the outputs of the detectors to a differential amplifier develops a control potential of a polarity and magnitude determined by the ssense and extent of radial displacement of the probe from ots intended position. This control potential may be used for compensation.

Any device that effects a mechanical displacement, controlled in direction and amount, by the polarity and magnitude of an applied control effect, would be useful. In general, such devices are referred to as a transducer and illustrative examples include a cone-type speaker as well as a piezo-electric element, particularly that which has become known as a bimorph.

Figure 5B:
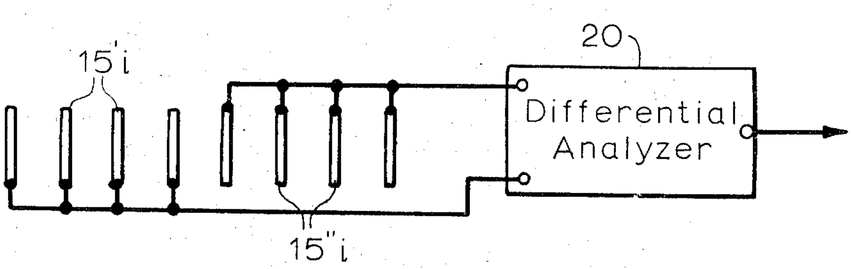
Figure 5C:
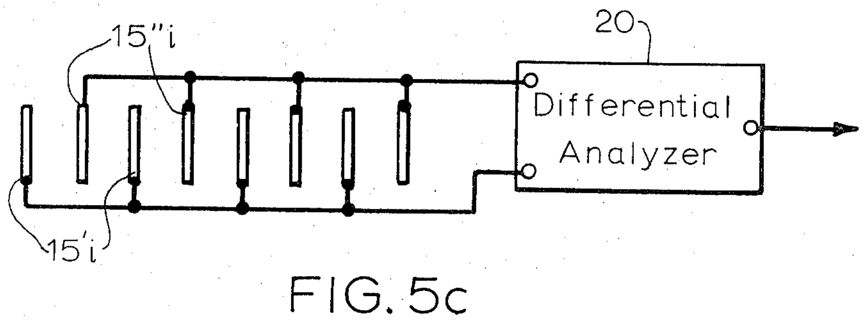
Figure 5D:
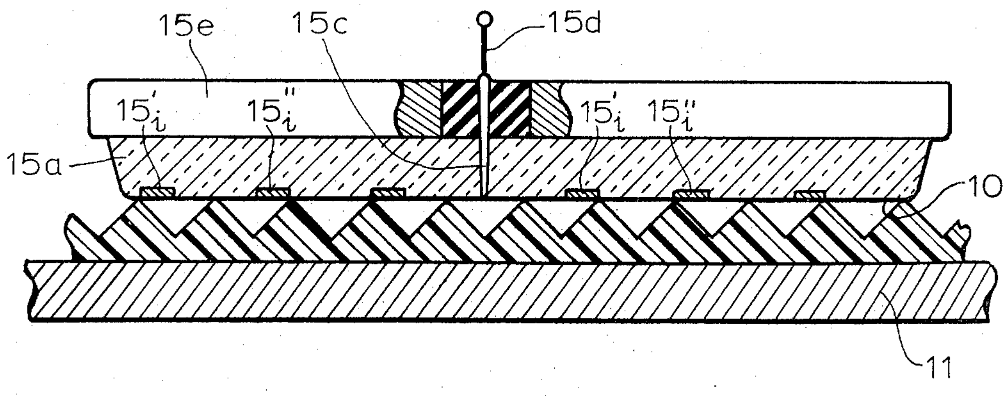
Figure 5E:
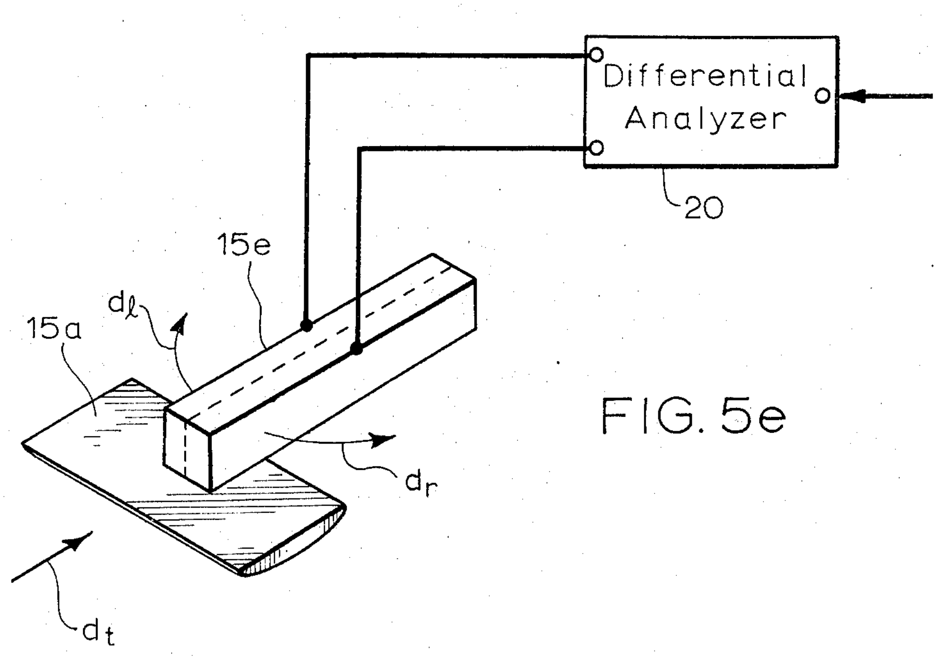

An arrangement to effect compensation with such an element is shown in FIG. 5*e* wherein boom 15*e* takes the form of a bimorph element such as that described in U.S. Pat. No. 2,633,543. Both the extent of the deformation of the element and the sense in which it takes place are controllable by selecting the magnitude and polarity of the applied voltage. Thus, as indicated in FIG. 5*e*, the groove tracking direction is shown by arrow $d_t$ while the bimorph may be deflected to the left in the direction of arrow $d_l$ or, alternatively, to the right in the direction of arrow $d_r$. The direction and extent of the deflection is controlled by differential analyzer 20 which produces a control voltage in response to unwanted radial displacement of probe 15*c* and that voltage, applied to bimorph 15*e*, occasions a compensating deflection to return the probe to its preferred tracking position.

The servo or radial compensation control arrangement that has been described is simply one of a number that will suggest themselves to those skilled in the art.

The configuration of FIG. 5*b* has the disadvantage that a slight tilting of the pickup may cause an unbalance to exist which in turn would cause the servo to hunt, or become balanced in the wrong position. FIGS. 5*c* and 5*d* show an alternative arrangement in which the conductive fingers carried on the bearing surface of the pickups are spaced 1½ groove spacings apart.

When the conductive fingers are interconnected as shown in FIG. 5*d*, the pickup will not be sensitive to tilt, however there is a substantial fixed capacity associated with the configuration shown in FIGS. 5*c* and 5*d*.

In either arrangement, the two sets of conductive fingers of the pickup may be used to change the operating frequency of assigned oscillators from which a difference frequency may be derived and utilized in correcting the radial position of probe 15*c*.

All of the described pickup arrangements feature a fine conductive probe surrounded by a non-conductive material which has a low coefficient of sliding friction when in contact with the record disc being tracked. This has the distinct advantage of reducing the tracking pressure since the contact area has been very materially increased. As a consequence, the described embodiments of an electrostatic pickup exhibit much improved life. Moreover, the arrangements permit mechanical radial tracking in the manner of FIG. 4 or electrical tracking in accordance with the embodiment of FIG. 5*a* which makes possible stop frame as well as slow motion image reproduction because there is no mechanical coupling inside the grooves between the pickup and the record being tracked.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. An electrostatic pickup for sensing undulations formed in a pattern of grooves on the surface of a record disc to constitute a spatial representation and storage of the time variations of a signal to be reproduced, which disc further includes a conductive coating, said pickup comprising:

a body of insulating material having a bearing or tracking surface with a length much greater than the pitch of the record grooves;

a probe of conductive material extending through said body transversely of and intermediate the ends of said bearing surface and projecting into the plane of said bearing surface to sense the groove being tracked, said probe having a dimension measured along the direction of the groove that is small relative to the spatial wavelength of the signal stored on said disc;

a first family of capacitive conductive elements supported by said insulating body and extending in the direction of and adapted to overlie one section of said groove patterns; and a second family of capacitive conductive elements also supported by said body and extending in the direction of and adopted to overlie a different section of said groove pattern, each of said capacitive conductive families of conductive elements individually exhibiting, with respect to the disc conductive coating, a capacitance having a predetermined reference value when said probe overlies the middle of a record groove being sensed but, each said family of elements exhibiting a different capacitance of a value which varies in sense and in amount in proportion to the radial displacement of said probe relative to the middle of the record groove being sensed.

2. An electrostatic pickup in accordance with claim 1 in which said body is supported on a tracking arm that comprises a transducer which, in response to an applied potential, deflects said body and said probe radially of the record groove being sensed in an amount and in a direction determined by the amplitude and polarity, respectively, of the applied potential.

3. An electrostatic pickup system including a pickup in accordance with claim 1 which further includes:

means responsive to the capacitance variations of said first and second capacitive conductive elements for developing a control potential representing the sense and the amount of radial displacement of said probe from the middle of the record groove being sensed; and means for applying said potential to said transducer to maintain said probe in the middle of the record groove being sensed.

4. An electrostatic pickup of the type set forth in claim 1 in which the elements overlying said one section of said groove pattern confront predetermined portions of their underlying grooves while the elements overlying said different section of said groove pattern confront portions of their underlying grooves so that the capacitances exhibited by said first and second families of conductive elements vary in related amounts, but in opposite senses, in response to radial displacement of said probe relative to the middle of the record groove being sensed.

5. An electrostatic pickup in accordance with claim 1 in which said first family of elements are positioned along one side of said probe and said second family of elements are positioned along the opposite side of said probe.

6. An electrostatic pickup of the type set forth in claim 5 in which the center-to-center spacing of said elements in each of said families is substantially equal to the pitch of said groove pattern.

7. An electrostatic pickup in accordance with claim 1 in which conductive elements of each of said families are arranged in an interleaved pattern on each side of said probe.

8. An electrostatic pickup of the type set forth in claim 7 in which the center-to-center spacing of said elements in each of said families is substantially equal to 1½ times the pitch of said groove pattern.

* * * * *